United States Patent
Hsu et al.

(10) Patent No.: US 7,597,928 B2
(45) Date of Patent: Oct. 6, 2009

(54) MATERIAL COMPOSITION FOR PACKAGING OF LIGHT-SENSITIVE COMPONENTS AND METHOD OF USING THE SAME

(75) Inventors: Tsai-Fa Hsu, Tainan (TW); Fu-Lung Jeng, Lu-Chu Hsiang (TW)

(73) Assignee: Eternal Chemical Co., Ltd. (TW)

( * ) Notice: Subject to any disclaimer, the term of this patent is extended or adjusted under 35 U.S.C. 154(b) by 1038 days.

(21) Appl. No.: 10/789,504

(22) Filed: Feb. 27, 2004

(65) Prior Publication Data

US 2004/0220380 A1    Nov. 4, 2004

(30) Foreign Application Priority Data

Feb. 27, 2003    (TW) .............................. 92104467 A

(51) Int. Cl.
*B28B 19/00* (2006.01)

(52) U.S. Cl. .................... 427/96.1; 427/96.2; 427/97.5; 523/403

(58) Field of Classification Search ................ 427/96.1, 427/96.2, 97.5, 403; 524/403; 523/403
See application file for complete search history.

(56) References Cited

U.S. PATENT DOCUMENTS

| 5,145,889 | A  | * | 9/1992 | Wada et al. ................. 523/451 |
| 2002/0014706 | A1 | | 2/2002 | Tanaka | |
| 2002/0022681 | A1 | * | 2/2002 | Ichiroku et al. ............. 524/261 |
| 2002/0077421 | A1 | * | 6/2002 | Sumita et al. ............... 525/107 |
| 2002/0089071 | A1 | * | 7/2002 | Sumita et al. ............... 257/793 |
| 2003/0071368 | A1 | * | 4/2003 | Rubinsztajn ................ 257/793 |

FOREIGN PATENT DOCUMENTS

| TW | ROC 459355 | 10/2001 |
| TW | ROC 478136 | 3/2002 |
| TW | ROC 498532 | 8/2002 |
| TW | ROC 501244 | 9/2002 |
| TW | ROC 503574 | 9/2002 |

* cited by examiner

*Primary Examiner*—Binh X Tran
(74) *Attorney, Agent, or Firm*—Scully, Scott, Murphy & Presser, P.C.

(57) ABSTRACT

The invention pertains to a material composition for packaging. The composition comprises (a) an epoxy resin and (b) a curing agent, wherein the mixing ratio of said epoxy resin to said curing agent is in the range of from 0.7 to 1.1. The invention also pertains to a method of using said material composition for packaging a light-sensitive component on a substrate.

10 Claims, No Drawings

MATERIAL COMPOSITION FOR PACKAGING OF LIGHT-SENSITIVE COMPONENTS AND METHOD OF USING THE SAME

BACKGROUND OF THE INVENTION

1. Field of the Invention

The present invention relates to a material composition and its use for the packaging of light-sensitive components.

2. Description of the Prior Art

In view of the coming of digital age, light-sensitive components have been widely utilized in various electronic products. Particularly, the development of image sensors has progressed rapidly.

In general, a method for packaging an image sensor comprises using a mold compound to form a dam around each modular circuit by a transfer molding process; fixing an image sensor to the circuit by a conductive adhesive and accomplishing the wire bonding; applying an adhesive over the dam and placing a glass sheet on the adhesive; and curing the adhesive. ROC Patent Publications No. 459355, 478136, 503574, and 501244 have disclosed packaging structures and methods of image sensors.

In conventional processes, the light-transmission layer covering image sensor chips is normally glass, as disclosed in the above-mentioned patent publications. This is because glass has low refractive indices, high light-transmission, and scratch resistance. However, in the processes utilizing light-transmission layers of glass, the chips can only be packaged one by one. Such packaging manner will consume a larger amount of efforts and time, cannot achieve good yields, and is costly.

ROC Patent Publication No. 489532 describes a stacked structure of an image sensor. This patent publication also discloses utilizing a molding compound and transfer molding, but the light-transmission layer for covering by molding is a transparent resin layer rather than a glass sheet, Nonetheless, said patent publication does not teach, disclose, or suggest what the properties which the resin would possess are or what the effects which the resin would have on light are.

Although conventional epoxy resins with a benzene ring, such as bisphenol A epoxy resin, bisphenol F epoxy resin, and nathalene-type epoxy resin, are transparent, the refractive indices of such resins upon curing are all higher than 1.50. This is because when the visible light passes through a benzene ring, the unsaturated $\pi$ bond of the benzene ring will absorb the light to reduce a $\pi-\pi^*$ interaction and to alter the refractive indices and the light transmission rates. The use of those epoxy resins without any benzene rings may effectively reduce refractive indices. However, such resins do not have the properties, such as high glass transition temperatures and heat resistance, that glass possesses.

The inventors of the subject application have found that there are certain material compositions that are useful as encapsulating materials for packaging, in particular, the packaging of image sensors. Such material compositions, after being cured, will provide the advantages of high glass transition temperatures, low refractive indices, high light transmission, and scratch resistance, and can be used in transparent layers and as substitutes for glass. When utilizing the compositions of the present invention for packaging on a substrate, said compositions may be cured by heat and then the packaged substrate can be divided into single modules. Such packaging manner is simpler than that for single chip when using glass, and will reduce production cost and enhance production capacity and yield.

DESCRIPTION OF THE INVENTION

One of the objects of the invention is to provide a material composition for packaging comprising (a) an epoxy resin and (b) a curing agent, wherein the mixing ratio of said epoxy resin to said curing agent is in the range of from 0.7 to 1.1.

One more object of the present invention is to provide a method of using the above packaging material composition for packaging light-sensitive components on a substrate.

One of the objects of the invention is to provide a material composition for packaging comprising (a) an epoxy resin and (b) a curing agent, wherein the mixing ratio by weight of said epoxy resin to said curing agent is in the range of from 0.7 to 1.1.

There are no special requirements for the epoxy resins which can be used in the present invention. Examples of useful epoxy resins include bisphenol A epoxy resin, bisphenol F epoxy resin, an aliphatic epoxy resin, and a cycloaliphatic epoxy resin and a mixture thereof, of which the aliphatic epoxy resin and cycloaliphatic epoxy resin are the preferred epoxy resin. Non-limiting examples of suitable epoxy resins include, for example, ERL-4221 and ERL-4229, commercially available from Dow Chemical; EPON 1510, Holxy Modifer 7, Holxy Modifer 8, Holxy Modifer 61, Holxy Modifer 116, Holxy Modifer 48, Holxy Modifer 67, Holxy Modifer 68, and Holxy Modifer 107, commercially available from Resolution; and EPICLON EXA-7015, EXA-7120, and EPICLON 726D, commercially available from Dainippon Ink & Chemical, Inc.

The material composition for packaging of the present invention comprises (a) an epoxy resin and (b) a curing agent wherein the mixing ratio by weight of said epoxy resin to said curing agent is in the range of from 0.7 to 1.1, preferably from 0.85 to 1.0.

The material composition for packaging of the present invention may optionally comprise one or more additives well known to persons skilled in the art. Such additives include, for example, a promoter, an antifoaming agent, and an antioxidant.

The promoters which may be useful in the present invention are well known to persons skilled in the art. Non-limiting examples of the useful promoters include the salts, quaternary ammonium salts, and imidazole compounds and salts, of 1,8-diazabicyclo[5,4,0]-undec-7-ene ("DBU") and a mixture thereof. The quaternary ammonium salts useful as promoters are well known to persons skilled in the art. Non-limiting examples of such quaternary ammonium salts, include benzyl tributyl ammonium halides, benzyl trimethyl ammonium halides, benzyl tripropyl ammonium halides, phenyl tributyl ammonium halides, tetrabutyl ammonium halides, triphenyl benzyl ammonium halides, tetraethyl ammonium halides, and hexadecyl trimethyl ammonium halides.

The present invention also pertains to a method of using the above material composition in packaging light-sensitive components, comprising applying the material composition to the light-sensitive components on a substrate. According to the present invention, the light-sensitive components include, but are not limited to, image sensors. Non-limiting examples of the substrates include printed circuit boards and lead frames.

According to one embodiment of the present invention, the material composition for packaging image sensors comprises (a) an epoxy resin selected from the group consisting of an aliphatic epoxy resin, a cycloaliphatic epoxy resin, and a mixture thereof and (b) a curing agent selected from the group consisting of acid anhydrides, wherein the mixing ratios of said epoxy resin to said curing agent are in the range of from 0.7 to 1.1, preferably 0.85 to 1.0.

The present invention will be further described in the following examples. However, the examples will not make any limitations to the scope of the invention. Any modifications or alterations on the invention that can be easily accomplished by persons skilled in the art are encompassed in the disclosure of the specification and the accompanying claims.

EXAMPLES

The compositions with the formulas as shown in Table 1 below are prepared in accordance with the following procedure:

|  | Formula 1 | | Formula 2 | |
|---|---|---|---|---|
| Epoxy | EPON 828 | 30 | ERL-4221 | 20 |
|  | — | — | EPON 1510 | 10 |
| Curing agent | MHHPA | 30 | MHHPA | 30 |
| Promoter | QUATERNARY AMMONIUM SALTS | 0.3 | QUATERNARY AMMONIUM SALTS | 0.3 |

The epoxy resin, curing agent and promoter are mixed at the predetermined ratios. The resultant mixture is poured into an aluminum container and baked at 120° C. for one hour. The thickness of the samples is controlled at about 1 mm. The samples are tested by UV spectrometer for the light transmission rates at the visible range of 400~800 nm (background: air). The results of the test are shown in the following Table 2.

The epoxy resin, curing agent and promoter are mixed at the predetermined ratios. The resultant mixture is spin coated onto a silicon wafer. The thickness of the coating is about 5 μm. After being cured by backing, refractive index of the coating is determined by METRICON Model 2010 Prism Coupler at the wavelength of 1320 nm. The results of the test are shown in the following Table 2.

The epoxy resin, curing agent and promoter are mixed at the predetermined ratios. The resultant mixture is poured into an aluminum container and baked at 120° C. for one hour. The thickness of the samples is controlled at about 1 mm. The samples were tested by pencil-hardness meter for scratch resistance. Moreover, the samples were further molded and tested by thermal mechanical analyzer (PE DMA7.0) to determine their glass transition temperatures. The results of the tests are shown in Table 2 below.

TABLE 2

| Results of the Tests | | |
|---|---|---|
|  | Formula 1 | Formula 2 |
| Light transmission | >90% | >90% |
| Refractive index | 1.5342 | 1.4889 |
| Glass transition temperature, ° C. | 125 | 153 |
| Pencil hardness | 2H | 3H |

It can be concluded from the results in Table 2 that the material compositions comprising an aliphatic epoxy resin or cycloaliphatic epoxy resin admixed with a curing agent at the ratio of 0.7 to 1.1 possess good light transmission rates, low refractive indices, high glass transition temperatures, and good scratch resistance.

What is claimed is:

1. A material composition for packaging consisting essentially of (a) an epoxy resin selected from the group consisting of bisphenol A epoxy resin, bisphenol F epoxy resin, an aliphatic epoxy resin, and a cycloaliphatic epoxy resin, and a mixture thereof, and (b) a curing agent selected from acid anhydrides, and (c) a promoter selected from the group consisting of the quaternary ammonium salts, imidazole compounds, and salts of 1,8-diazabicyclo[5,4,0]-undec-7-ene, and a mixture thereof, wherein the mixing ratio by weight of said epoxy resin to said curing agent is in the range of from 0.7 to 1.1.

2. The composition of claim 1, wherein the mixing ratio by weight of said epoxy resin to said curing agent is in the range of from 0.85 to 1.0.

3. The composition of claim 1, wherein said epoxy resin is an aliphatic epoxy resin or a cycloaliphatic epoxy resin or a mixture thereof.

4. The composition of claim 1, wherein said acid anhydride is selected from the group consisting of hexahydrophthalic anhydride, methyl hexahydrophthalic anhydride, methyl-bicyclo[2,2,1]-heptene-2,3-dicarboxylic anhydride, succinic anhydride, and hexafluoroisopropylidene-2,2-bisphthalic anhydride, and a mixture thereof.

5. A method for packaging light-sensitive components comprising applying the material composition according to claim 1, claim 2, claim 3 or claim 4 to the light-sensitive components on a substrate.

6. The method of claim 5, wherein said light-sensitive components are image sensors.

7. The method of claim 5, wherein said substrate is a printed circuit board or lead frame.

8. A material composition for packaging an image sensor consisting essentially of (a) an epoxy resin selected from the group consisting of an aliphatic epoxy resin, and a cycloaliphatic epoxy resin, and a mixture thereof, (b) a curing agent selected from acid anhydrides and (c) a promoter selected from the group consisting of the quaternary ammonium salts, imidazole compounds, and salts of 1,8-diazabicyclo[5,4,0]-undec-7-ene, and a mixture thereof, wherein the mixing ratio by weight of said epoxy resin to said curing agent is in the range of from 0.7 to 1.1.

9. The composition of claim 8, wherein the mixing ratio by weight of said epoxy resin to said curing agent is in the range of from 0.85 to 1.0.

10. The composition of claim 8, wherein said acid anhydride is selected from the group consisting of hexahydrophthalic anhydride, methyl hexahydrophthalic anhydride, methyl-bicyclol[2,2,1]-heptene-2,3-dicarboxylic anhydride, succinic anhydride, and hexafluoroisopropylidene-2,2-bisphthalic anhydride, and a mixture thereof.

* * * * *